(No Model.)
W. G. GASS & W. A. GALASHAN.
FRICTION CLUTCH.
No. 275,186. Patented Apr. 3, 1883.
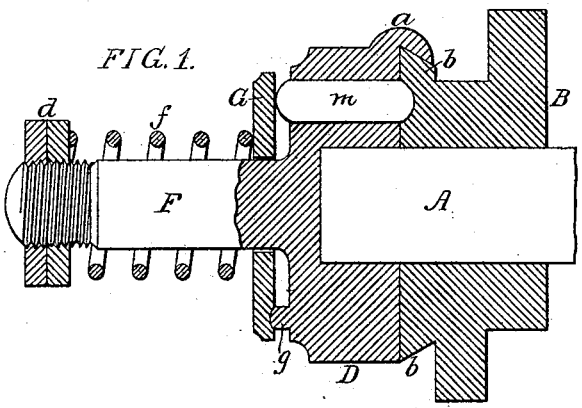
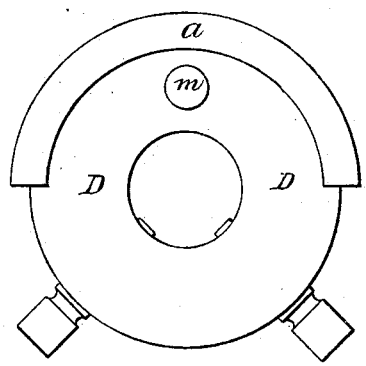
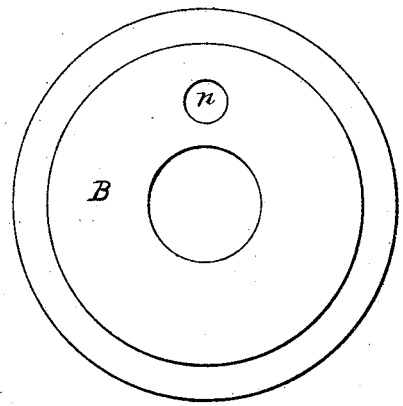
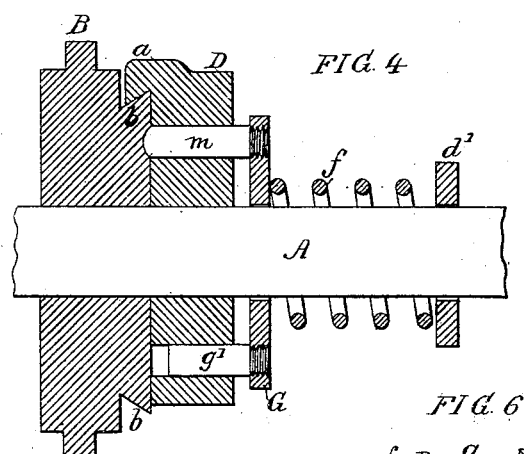
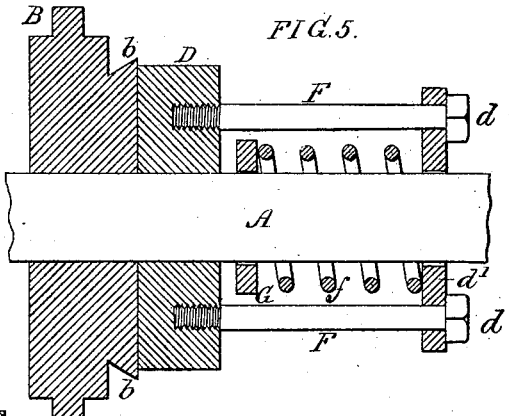
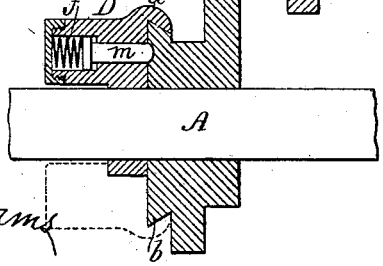
WITNESSES:
Harry Drury
David Williams
INVENTORS:
William G. Gass
and
William A. Galashan
by their Attorneys
Howson and Sons
N. PETERS, Photo-Lithographer, Washington, D. C.

UNITED STATES PATENT OFFICE.

WILLIAM G. GASS AND WILLIAM A. GALASHAN, OF PHILADELPHIA, PA.

FRICTION-CLUTCH.

SPECIFICATION forming part of Letters Patent No. 275,186, dated April 3, 1883.

Application filed February 27, 1883. (No model.)

*To all whom it may concern:*

Be it known that we, WILLIAM G. GASS, a subject of the Queen of Great Britain and Ireland, and a resident of Philadelphia, Pennsylvania, and WILLIAM A. GALASHAN, a citizen of the United States, and a resident of Philadelphia aforesaid, have invented certain Improvements in Friction-Clutches, of which the following is a specification.

The object of our invention is to construct a simple and efficient form of friction-clutch which can be readily applied to a shaft either at the end or at a point between the ends, and this object we attain in the manner which we will now proceed to describe, reference being had to the accompanying drawings, in which—

Figure 1 is a longitudinal section of one form of our improved friction-clutch; Figs. 2 and 3, face views of parts of the same; Figs. 4 and 5, a vertical section and sectional plan, respectively, of another form of the clutch; and Fig. 6, a sectional view of a further modification.

Figs. 1, 2, and 3 show our improved clutch constructed for adaptation to the end of a shaft. A is the shaft, and B a wheel, pulley, cam, or other device, which is loose on the shaft, but must be clutched thereto in such manner that when it meets with undue resistance its movement can be arrested without interfering with the continued rotation of the shaft.

The device in the present instance is a cam-wheel, such as is used in looms, and in describing the invention we will allude to the device generally as a "wheel," it being understood that this term includes any device which must work under the conditions just set forth.

To the end of the shaft A is securely bolted a disk, D, on which is formed a segmental flange, *a*, this flange embracing a beveled rim, *b*, on the wheel B, so that longitudinal separation of the wheel and disk is impossible, although the disk can rotate, when necessary, independently of the wheel. From the disk D projects a stem, F, the outer end of which is threaded for the reception of a pair of nuts, *d*, and against the inner nut bears the outer end of a spiral spring, *f*, which surrounds the stem and bears at the inner end against a ring, G. This ring bears near one edge against a lug, *g*, on the disk D, and near the opposite edge against the outer end of a pin, *m*, which is fitted to but is free to slide in an opening in the disk, and has a rounded or beveled inner end adapted to a rounded or beveled recess, *n*, in the face of the wheel B, as shown in Figs. 1 and 3. Under ordinary circumstances the wheel B will be locked to the disk D by the pin *m*, and will rotate with the disk and shaft; but as soon as there is any undue resistance to the rotation of the wheel the pin *m* will be caused to yield, owing to its beveled end and the beveled recess in the wheel, and the disk will rotate without carrying the wheel with it, the pin again locking the wheel to the disk, however, as soon as undue resistance to the movement of said wheel ceases.

Figs. 4 and 5 show our improved clutch constructed for application to a shaft at any desired point in its length. In this case the disk D has two studs F—one on each side of the shaft—the outer threaded ends of the studs having nuts *d*, which confine a plate, *d'*, forming the outer end bearing for the spring *f*. The ring G has a guide-pin, *g'*, adapted to an opening in the disk D, instead of bearing against a lug on the disk, as in Fig. 1.

A lever may be used instead of the ring G; or the spring *f* may act directly on the pin *m*, if desired, as shown in Fig. 6, for instance. In this modification the pin is carried by an arm on the shaft A, instead of by a disk, and said arm may in some cases be double, so as to carry two pins, as shown by dotted lines.

Instead of providing the disk with a flange embracing a rim on the wheel, the latter may bear against a collar on the shaft. The flange is preferable, however, especially when compactness is an object.

We claim as our invention—

1. A frictional clutching device in which are combined the shaft A, the wheel loose on the shaft and having a beveled recess, the disk or equivalent device, secured to the shaft and carrying a pin, *m*, with beveled end adapted to the recess, and a spring for imparting a yielding pressure to said pin, as set forth.

2. The combination of the shaft A, the wheel B, loose on the shaft, and having a beveled recess and a rim, b, the disk D, secured to the shaft and having a pin, m, with beveled end, and a flange, a, embracing the rim b, and a spring for imparting pressure to said pin, as set forth.

3. The combination of the disk D, its pin m, and stem or stems F, the nuts d, spring f, and ring or lever G, as set forth.

In testimony whereof we have signed our names to this specification in the presence of two subscribing witnesses.

WILLIAM G. GASS.
WILLIAM A. GALASHAN.

Witnesses:
HARRY DRURY,
HARRY SMITH.